(12) United States Patent
Liao et al.

(10) Patent No.: US 7,897,978 B2
(45) Date of Patent: Mar. 1, 2011

(54) TILT SENSOR DEVICE

(75) Inventors: Chih-Wei Liao, Tu Chen (TW);
Li-Chuan Hsu, Tu Chen (TW)

(73) Assignee: Everlight Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 12/636,187

(22) Filed: Dec. 11, 2009

(65) Prior Publication Data

US 2010/0148043 A1    Jun. 17, 2010

(30) Foreign Application Priority Data

Dec. 12, 2008    (TW) .............................. 97148533 A

(51) Int. Cl.
*H01L 27/15* (2006.01)

(52) U.S. Cl. ............................. 257/80; 257/79; 257/81; 257/431; 257/432

(58) Field of Classification Search .................. 257/79, 257/80, 81, 431, 432
See application file for complete search history.

(56) References Cited

U.S. PATENT DOCUMENTS

2006/0007153 A1 *    1/2006    Ledbetter et al. ............ 345/163

* cited by examiner

*Primary Examiner*—Long Pham
(74) *Attorney, Agent, or Firm*—Muncy, Geissler, Olds & Lowe, PLLC

(57) ABSTRACT

A tilt sensor includes a body; a first emitter and a first receiver being spacedly disposed on the body, the first receiver being used for receiving a first signal emitted from the first emitter, a second emitter and a second receiver being spacedly disposed on the body, the second receiver being used for receiving a second signal emitted from the second emitter, and an arm rotatably secured on the body. As the tilt sensor device is in a first tilt state, the arm blocks the first receiver to receive the first signal. As in a second tilt state, the arm blocks the second receiver to receive the second signal. As in a third tilt state, the arm blocks none of the first receiver and the second receiver to receive the first signal and to receive the second signal respectively.

11 Claims, 3 Drawing Sheets

TILT SENSOR DEVICE

RELATED APPLICATIONS

This application claims priority to Taiwan Application Serial Number 97148533, filed Dec. 12, 2008, which is herein incorporated by reference.

BACKGROUND

1. Field of Invention

The present invention relates to a tilt sensor device. More particularly, the present invention relates to an arm-type tilt sensor device.

2. Description of Related Art

Many consumer electronics, such as digital cameras or mobile phones, have a tilt sensor inside. The conventional tilt sensor uses a ball rolling inside a channel by gravity to interrupt a signal communicated between an emitter and a receiver. The conventional tilt sensor detects the tilted state of the electronics according to whether the signal communicated between the emitter and the receiver is interrupted by the rolling ball or not. However, the conventional tilt sensor can detect whether the consumer electronics is tilted in a single direction only, but cannot detect the tilted status in other directions or the tilted angle of the consumer electronics.

SUMMARY

A tilt sensor device is provided. The tilt sensor device includes a body, a first emitter, a first receiver, a second emitter, a second receiver, and an arm. The first emitter and the first receiver are spacedly disposed on the body, and the first receiver is used for receiving a first signal emitted from the first emitter. The second emitter and the second receiver are spacedly disposed on the body, and the second receiver is used for receiving a second signal emitted from the second emitter. The arm is rotatably secured on the body. As the tilt sensor device is in a first tilt state, the arm blocks the first receiver to receive the first signal. As in a second tilt state, the arm blocks the second receiver to receive the second signal. As in a third tilt state, the arm blocks none of the first receiver and the second receiver to receive the first signal and to receive the to second signal respectively.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Accordingly, a tilt sensor device includes at least two pairs of emitter and receiver and an arm is provided, wherein the arm can only interrupt one of the first and the second signal at one time. The aforementioned emitters can be infrared emitters, for example. The receivers can be infrared receivers, photo diodes, phototransistors, or sensor integrated circuits, for example.

Figure 1A:
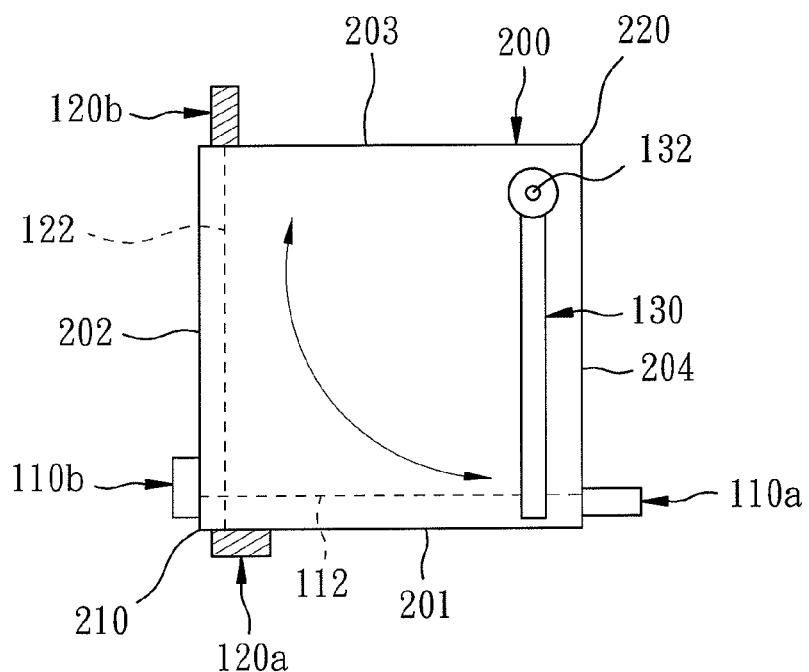
FIG. 1A is a diagram showing a tilt sensor device at a level state according to one embodiment of this invention.

FIG. 1A is a diagram showing a tilt sensor device at a level state according to an embodiment of this invention. In FIG. 1A, a first pair of a first emitter 110a and a first receiver 110b are configured to a body 200, so that a first signal 112 emitted from the first emitter 110a to the first receiver 110b is near a first side 201 of the body 200, for example. A second pair of a second emitter 120a and a second receiver 120b is configured to the body 200, so that a second signal 122 emitted from the second emitter 120a to the second receiver 120b is near a second side 202 of the body 200, for example. The first signal 112 is perpendicular across the second signal 122 at a position near a first corner 210 formed by the first side 201 and the second side 202, for example. According to another embodiment, the angle between the first signal 112 and the second signal 122 can also be any value other than 90 degrees.

An arm 130 is hung by a hinge 132 in the body 200. The hinge 132 is positioned near a second corner 220, which is diagonal to the first corner 210 and formed by a third side 203 and a fourth side 204, of the body 200. The length of the arm 130 is adjusted, so that only one of the first signal 112 and the second signal 122 can be completely or partially interrupted by the arm 130 at one time. In the level state of FIG. 1A, the arm 130 is positioned near the forth side 204 of the body 200, so that one part of the arm 130 is positioned near the first transmitter 110a to completely interrupt the first signal 112 to be received by the first receiver 110b, for example.

Figure 1B:
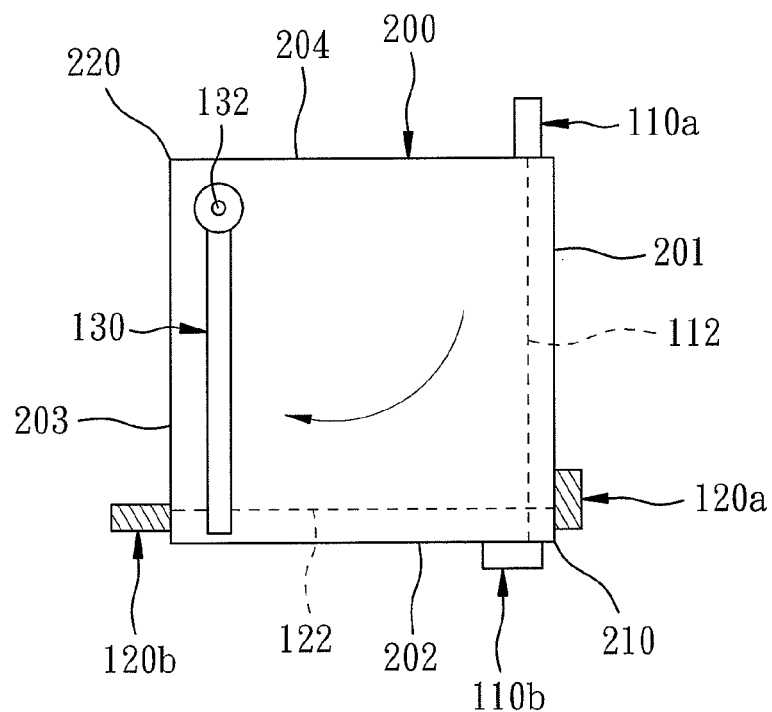
FIG. 1B is a diagram showing that the tilt sensor device in FIG. 1A counterclockwise rotated 90 degrees.

FIG. 1B is a diagram showing that the tilt sensor in FIG. 1A counterclockwise rotated 90 degrees. In FIG. 1B, the arm 130 is positioned near the third side 203 of body 200, so that one part of the arm 130 is positioned near the second receiver 120b to completely interrupt the second signal 122 emitted from the second transmitter 120a, for example.

If the tilt sensor is at a tilted state somewhere between the level state in FIG. 1A or the tilted state in FIG. 1B, the first signal 112 and the second signal 122 can be only partially interrupted or not be interrupted at all. Therefore, the signal strength received by the first receiver 110b and/or the second receiver 120b can be accordingly changed. Consequently, a tilted angle of the tilted sensor can be determined by the signal strength received by the first receiver 110b and/or the second receiver 120b.

Figure 2A:
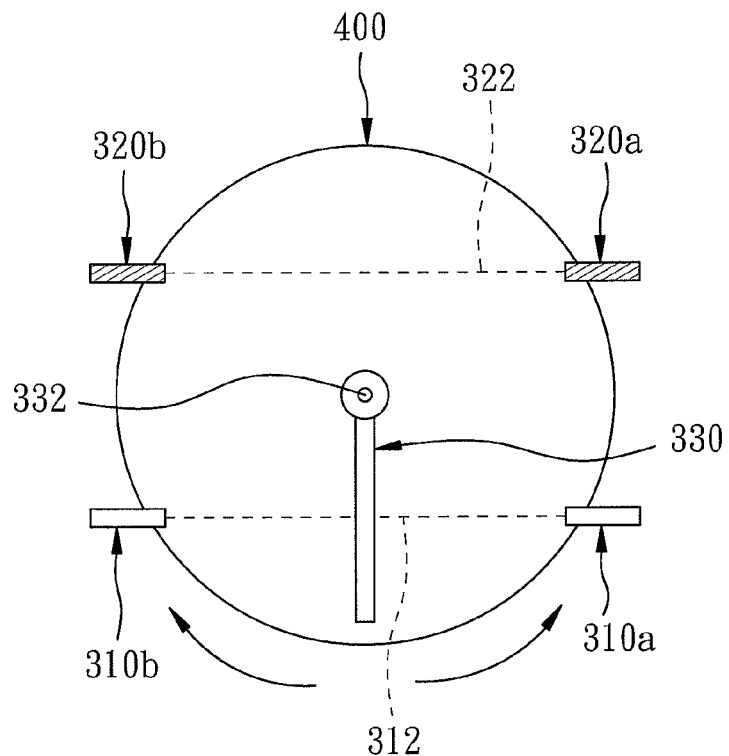
FIG. 2A is a diagram showing a tilt sensor device at a level state according to another embodiment of this invention.

FIG. 2A is a diagram showing a tilt sensor device at a level state according to another embodiment of this invention. In this embodiment, an arm 330 is hung by a hinge 332 in a center of a body 400. A first pair of a first emitter 310a and a first receiver 310b for receiving a first signal 312 from the first emitter 310a are configured below the hinge 332, and a second pair of a second emitter 320a and a second receiver 320b for receiving a second signal 322 from the second emitter 320a are configured above the hinge 332. In other words, the hinge 332 is between the first signal 312 and the second signal 322. Furthermore, the first signal 312 below the hinge 332 is parallel to the second signal 322 above the hinge 322. At the level state in FIG. 2A, the arm 330 completely interrupts the first signal 312 transmitted between the first emitter 310a and the first receiver 310b.

The tilt sensor device can rotate clockwise or counterclockwise. When the tilt sensor device in FIG. 2A rotates 180 degree clockwise or counterclockwise, the arm 330 is changed to completely interrupt the second signal 322 transmitted between the second emitter 320a and the second receiver 320b. When the tilt sensor device is at a status between 0 degree shown in FIG. 1 to 180 degrees, the first signal 312 and the second signal 322 is can be interrupted or not be interrupted at all.

Figure 2B:
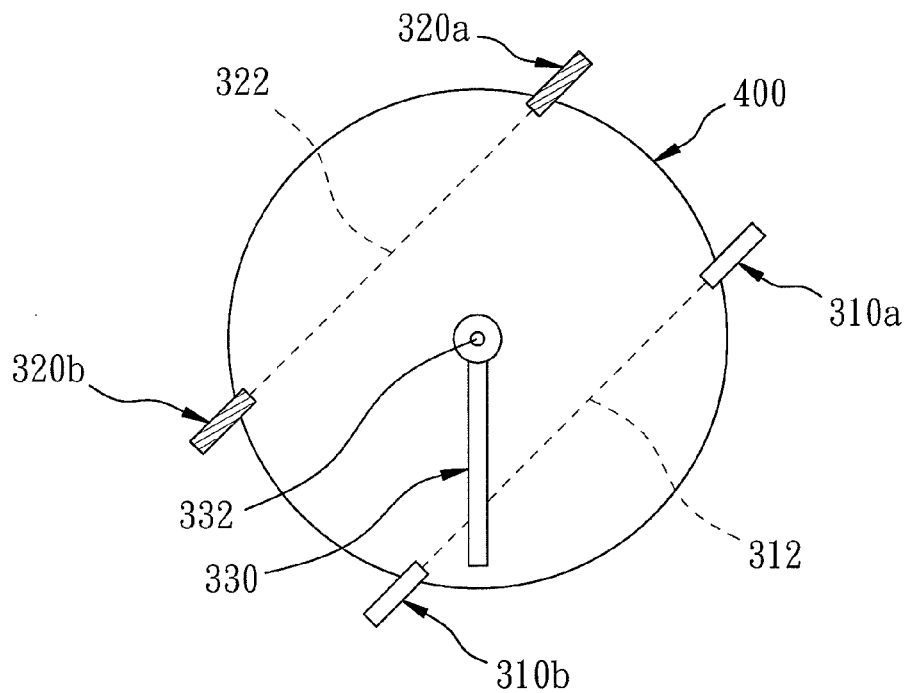
FIG. 2B is a diagram showing that the tilt sensor device in FIG. 2A counterclockwise rotated 45 degrees.
Figure 2C:
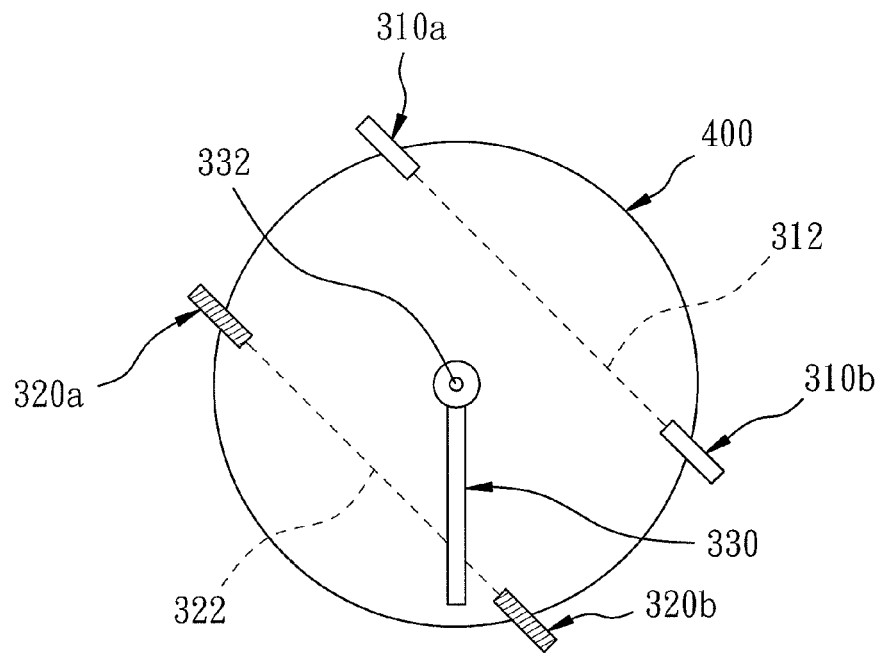
FIG. 2C is a diagram showing that the tilt sensor device in FIG. 2A counterclockwise rotated 135 degrees.
Figure 2D:
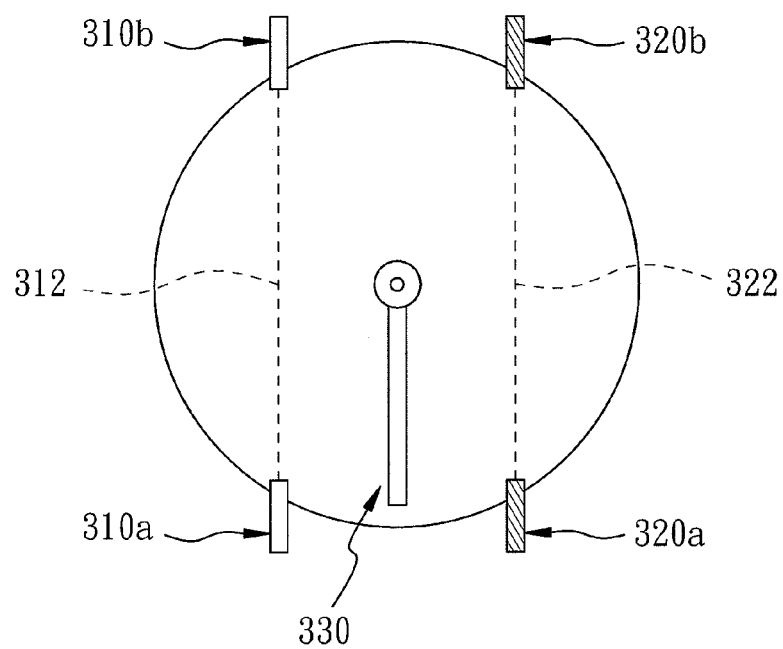
FIG. 2D is a diagram showing that the tilt sensor device in FIG. 2A clockwise rotated 90 degrees.

FIG. 2B to FIG. 2D shows the different status of the tilt sensor device by rotating to a different angle. FIG. 2B is a diagram showing that the tilt sensor device in FIG. 2A counterclockwise rotated 45 degrees. FIG. 2C is a diagram showing that the tilt sensor device in FIG. 2A counterclockwise rotated 135 degrees. FIG. 2D is a diagram showing that the tilt sensor device in FIG. 2A clockwise rotated 90 degrees. As shown in FIG. 2B and FIG. 2C, along with the tilt sensor device rotating to a different angle, the arm 330 interrupts the first signal 312 or the second signal 322 in the body 400 at one time. Or as shown in FIG. 2D, the arm 330 interrupts none of the signals. Accordingly, a tilted angle of the tilt sensor device is determined by which signal is received by the first receiver 110b or/and the second receiver 120b.

According to the above, the tilt sensor device can be set in electronics to detect the tilted angle of the electronics in multi-direction. In addition, the tilt sensor device also can be a simple level meter for adjusting the level status of a machine, such as a washing machine, that needs to function at a level state. Furthermore, increasing the number of the pairs of emitters and receivers can increase the sensitivity of the tilt sensor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tilt sensor device comprising:
    a body;
    a first emitter and a first receiver being spacedly disposed on the body, the first receiver being used for receiving a first signal emitted from the first emitter;
    a second emitter and a second receiver being spacedly disposed on the body, the second receiver being used for receiving a second signal emitted from the second emitter; and
    an arm rotatably secured on the body, wherein as the tilt sensor device is in a first tilt state, the arm blocks the first receiver to receive the first signal; as in a second tilt state, the arm blocks the second receiver to receive the second signal; and as in a third tilt state, the arm blocks none of the first receiver and the second receiver to receive the first signal and to receive the second signal is respectively.

2. The tilt sensor device of claim 1, wherein the arm is secured on the body by a hinge located nearby a first corner of the body.

3. The tilt sensor device of claim 2, wherein the first signal is across the second signal at a position near a second corner diagonal to the first corner.

4. The tilt sensor device of claim 3, wherein the first signal is perpendicular to the second signal.

5. The tilt sensor device of claim 1, wherein the hinge is located at a center of a body.

6. The tilt sensor device of claim 5, wherein the first signal is below the hinge, and the second signal is above the hinge.

7. The tilt sensor device of claim 6, wherein the first signal is parallel with the second signal.

8. The tilt sensor device of claim 1, wherein the first receiver is an infrared receiver, a photo diode, a phototransistor, or a sensor integrated circuit.

9. The tilt sensor device of claim 1, wherein the second receiver is an infrared receiver, a photo diode, a phototransistor, or a sensor integrated circuit.

10. The tilt sensor device of claim 1, wherein the first emitter is an infrared emitter.

11. The tilt sensor device of claim 1, wherein the second emitter is an infrared emitter.

* * * * *